United States Patent
Hilliard

(10) Patent No.: US 12,481,317 B2
(45) Date of Patent: Nov. 25, 2025

(54) COMPUTING DEVICE INCLUDING HINGE LINK AND SCISSOR COMPONENT

(71) Applicant: LENOVO (SINGAPORE) PTE. LTD., Singapore (SG)

(72) Inventor: Matthew Sean Hilliard, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 154 days.

(21) Appl. No.: 18/395,684

(22) Filed: Dec. 25, 2023

(65) Prior Publication Data
US 2025/0208648 A1  Jun. 26, 2025

(51) Int. Cl.
*G06F 1/16* (2006.01)

(52) U.S. Cl.
CPC ................. *G06F 1/1616* (2013.01)

(58) Field of Classification Search
CPC .... G06F 1/1681; G06F 1/1616; G06F 1/1624; G06F 1/1637; G06F 1/1677; G06F 1/1679; H04M 1/0216; H04M 1/0237; H04M 1/022; E05D 15/58; E05D 3/14
See application file for complete search history.

(56) References Cited

U.S. PATENT DOCUMENTS

| | | | |
|---|---|---|---|
| 9,091,105 B2 * | 7/2015 | Sayama | E05D 11/1014 |
| 9,277,659 B2 * | 3/2016 | Onda | H05K 5/0217 |
| 10,852,776 B1 * | 12/2020 | Morrison | G06F 1/1681 |
| 11,016,530 B2 * | 5/2021 | Watamura | G06F 1/1652 |
| 2009/0100639 A1 | 4/2009 | Tao et al. | |
| 2014/0070686 A1 | 3/2014 | Sip | |
| 2014/0226274 A1 | 8/2014 | Gomez et al. | |
| 2016/0041589 A1 * | 2/2016 | Tazbaz | H04M 1/022 361/679.06 |

OTHER PUBLICATIONS

EP Application No. 24214364.2-1218, Extended European Search Report, May 27, 2025 (date of completion of the search May 14, 2025).

* cited by examiner

*Primary Examiner* — Abhishek M Rathod
(74) *Attorney, Agent, or Firm* — Brian J. Pangrle

(57) ABSTRACT

A device can include a first housing that includes a hinge recess and a pivot; a second housing that includes a hinge recess and a pivot; a hinge link coupled to the pivots, where a pivot coupling between the hinge link and the pivot of the second housing includes an off-centered post, and where the hinge link includes a scissor component pivot; and a scissor component coupled to the scissor component pivot that guides the pivot of the second housing via the off-centered post to generate a gap between the first housing and an end of the second housing upon transitioning the first housing and the second housing between a closed position and a fully open position.

20 Claims, 10 Drawing Sheets

COMPUTING DEVICE INCLUDING HINGE LINK AND SCISSOR COMPONENT

TECHNICAL FIELD

Subject matter disclosed herein generally relates to technology for computing devices.

BACKGROUND

A computing device can include a display housing assembly and a keyboard housing assembly that are coupled via one or more hinge assemblies. For example, a laptop computing device (e.g., a laptop computer) can be a clamshell device with such housing assemblies.

SUMMARY

A device can include a first housing that includes a hinge recess and a pivot; a second housing that includes a hinge recess and a pivot; a hinge link coupled to the pivots, where a pivot coupling between the hinge link and the pivot of the second housing includes an off-centered post, and where the hinge link includes a scissor component pivot; and a scissor component coupled to the scissor component pivot that guides the pivot of the second housing via the off-centered post to generate a gap between the first housing and an end of the second housing upon transitioning the first housing and the second housing between a closed position and a fully open position. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
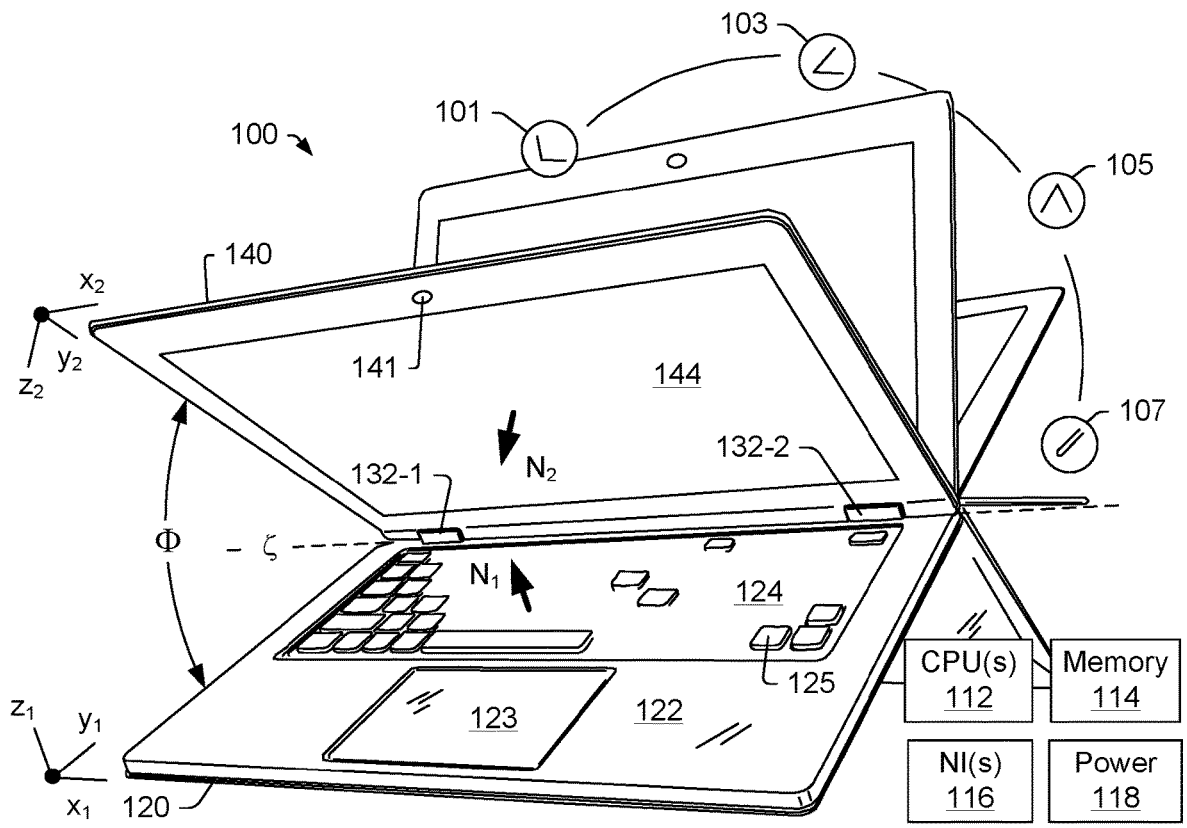
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system; noting that some clamshell computing systems may be limited in open angle orientations. For example, a clamshell computing system may be able to be opened to the orientation 109 (e.g., substantially 180 degrees) without being able to be opened to the orientation 107 (e.g., substantially 360 degrees).

As shown in FIG. 1, the orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle @ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user's hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle @ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
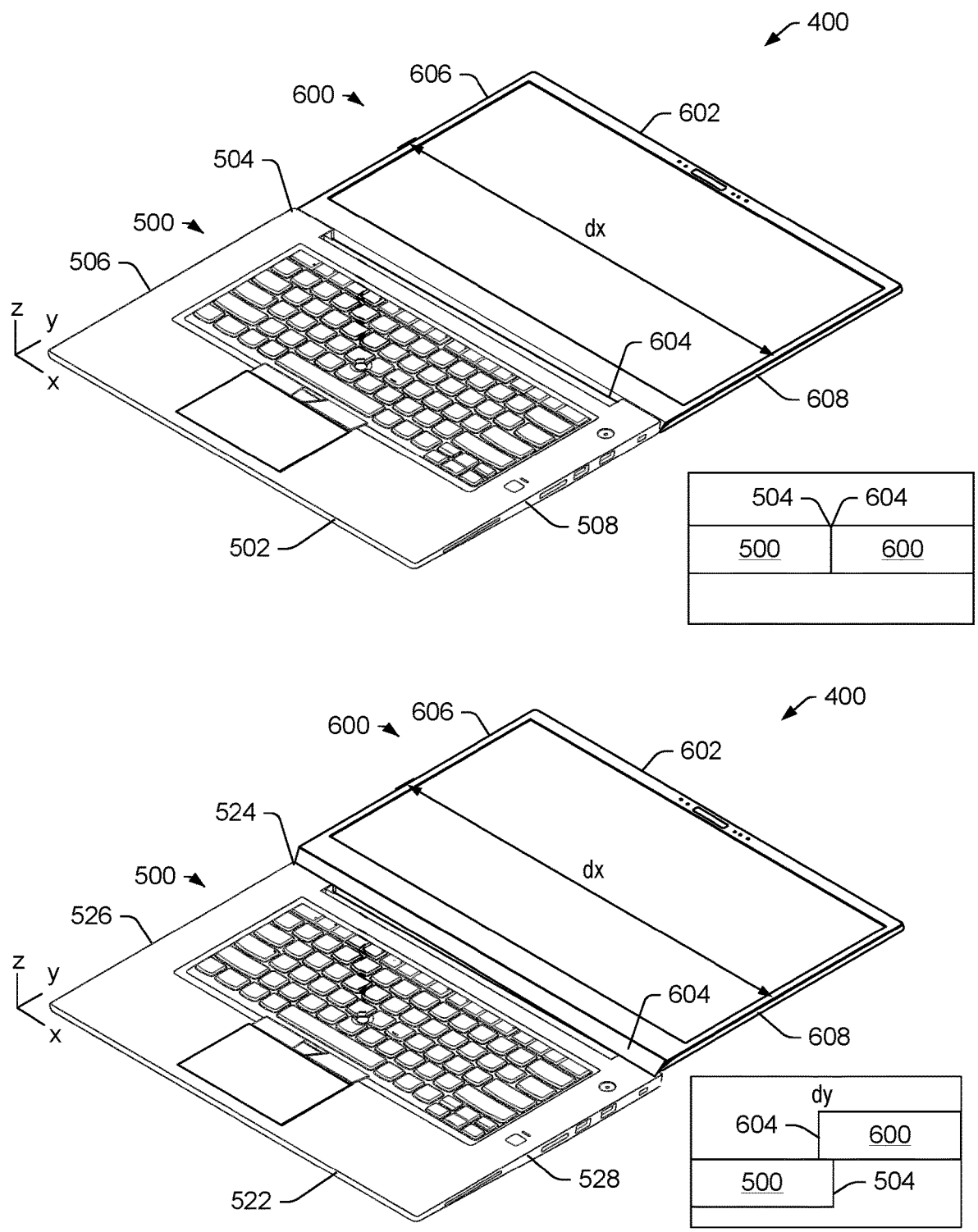
FIG. 2 is a series of diagrams of an example of a computing device or computing system.

FIG. 2 shows an example of a computing device 400 that includes a base housing 500 and a display housing 600 that can be coupled together via one or more hinge assemblies. As shown, the base housing 500 can include a front edge 502, a back edge 504 and opposing side edges 506 and 508 and the display housing 400 can include a front edge 602, a back edge 604 and opposing side edges 606 and 608. In the example of FIG. 2, the back edges 504 and 604 can be hinge side edges where one or more hinge assemblies couple the housings 500 and 600 together.

As shown, the computing device 400 may include one or more hinge assemblies that can provide for a substantially planar arrangement of the housing 500 and 600 when opened to approximately 180 degrees or, for example, the computing device 400 may include one or more hinge assemblies that can provide for a stepped arrangement of the housings 500 and 600 when opened to approximately 180 degrees. In the non-stepped arrangement, if the back edge 504 includes any features, these may become inaccessible once the computing device 400 is opened to approximately 180 degrees; whereas, in the stepped arrangement, if the back edge 504 includes any features, these may still be accessible once the computing device 400 is opened to approximately 180 degrees.

As to some examples of back edge features, these may include one or more vents, one or more connectors, one or more memory card slots, etc. Thus, in some instances, a stepped arrangement may provide some benefits over a non-stepped arrangement.

As shown in FIG. 2, the housings 500 and 600 may have a housing width dx, which may be approximately the same (e.g., plus or minus less than 5 mm). As to the stepped arrangement, a step dimension dy may be greater than approximately 1 mm (e.g., plus or minus 0.5 mm) and less than approximately 10 mm (e.g., plus or minus 2 mm). As an example, in a stepped arrangement, the housings 500 and 600 may contact each other over at least a portion of a step dimension (e.g., a step distance). As an example, one or more step surfaces may provide for contact that helps to limit further opening of the computing device 400 beyond approximately 180 degrees. As an example, one or more hinge assemblies may include one or more features that provide for limiting opening of the computing device 400 to beyond approximately 180 degrees.

Figure 3:
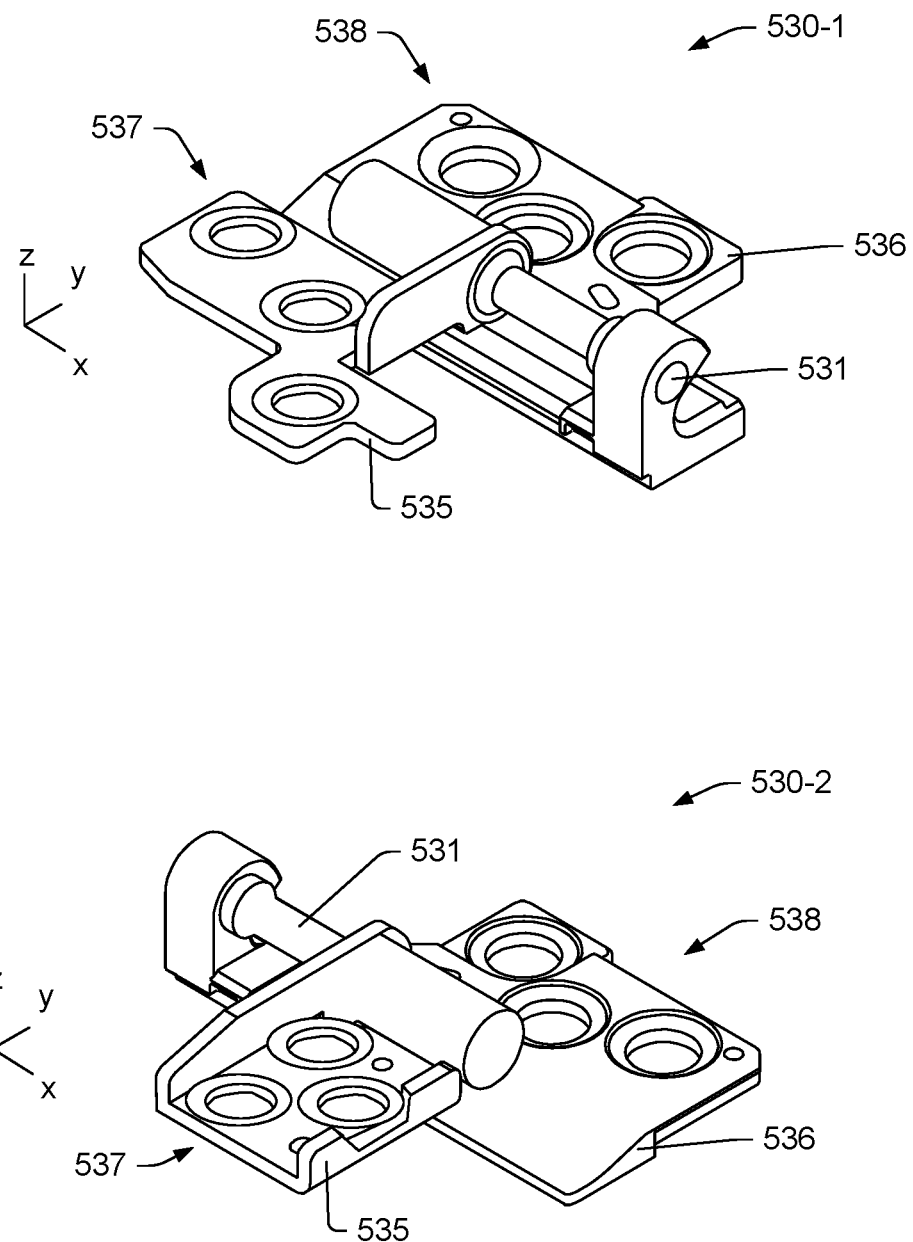
FIG. 3 is a series of diagrams of example of hinge assemblies.

FIG. 3 shows perspective views of example hinge assemblies 530-1 and 530-2. As shown, each of the hinge assemblies 530-1 and 530-2 can include an axle 531 that defines a rotational axis for a base housing leaf 535 and a display housing leaf 536 where each of the leaves 535 and 536 can include respective openings 537 and 538 for receipt of one or more fasteners to thereby couple the leaves 535 and 536 to a respective housing. As an example, one or more fasteners may be cooperatively coupled to a respective housing using one or more hinge mount features.

Figure 4:
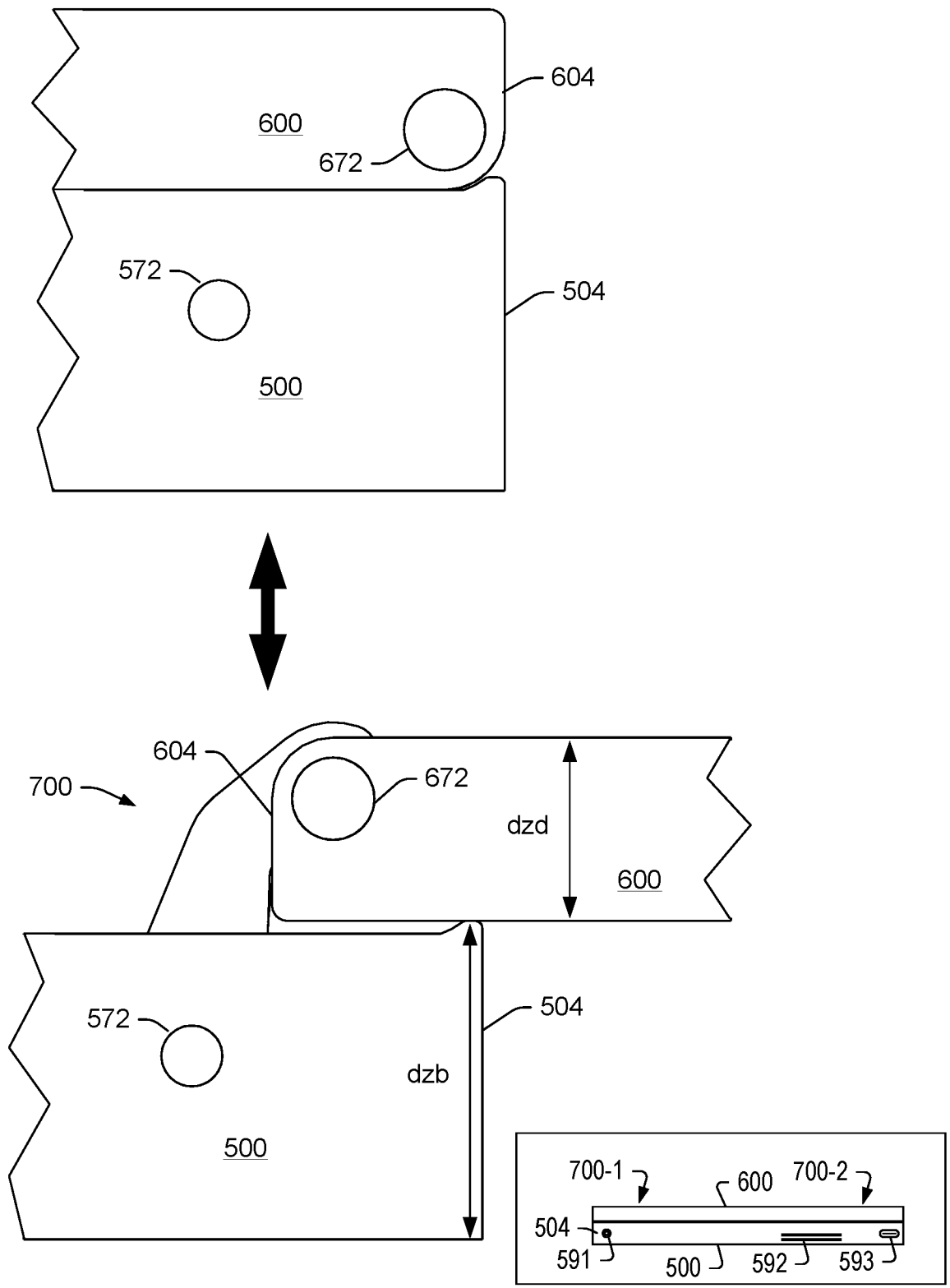
FIG. 4 is a series of diagrams of an example of a computing device.

FIG. 4 shows an example of a portion of a computing device that includes a base housing 500 and a display housing 600 along with a hinge assembly 700 that couples the housings 500 and 600 together. As shown, the hinge assembly 700 provides for a closed position where the edges 504 and 604 may be stacked and aligned and provides for an open position where the edges 504 and 604 may be offset to define a step, as in a stepped arrangement.

As shown in the example of FIG. 4, the base housing 500 may have a thickness or height dzb at or near the back edge 504 and the display housing 600 may have a thickness or height dzd at or near the back edge 604. As shown, in the open position, the back edge 504 may be exposed. As shown in the example of FIG. 4, the back edge 504 may include one or more features, such as, for example, one or more ports 591 and 593 and/or one or more vents 592. As an example, a device may include one or more instances of the hinge assembly 700, for example, consider the one or more hinge assemblies 700-1 and 700-2.

As shown in the example of FIG. 4, the display housing 600 can include a pivot 672 and the base housing 500 can include a pivot 572. As an example, the hinge assembly 700 may include a hinge link and a scissor component where the hinge link utilizes the pivots 572 and 672.

As an example, a device can include a first housing that includes a hinge recess and a pivot; a second housing that includes a hinge recess and a pivot; a hinge link coupled to the pivots, where a pivot coupling between the hinge link and the pivot of the second housing includes an off-centered post, and where the hinge link includes a scissor component pivot; and a scissor component coupled to the scissor component pivot that guides the pivot of the second housing via the off-centered post to generate a gap between the first housing and an end of the second housing upon transitioning the first housing and the second housing between a closed position and a fully open position. In such an example, the second housing may have thickness that is less than a thickness of the first housing. As an example, the device may be a computing device where the first housing is a base housing (e.g., a keyboard housing, etc.) and where the second housing is a display housing.

Figure 5:
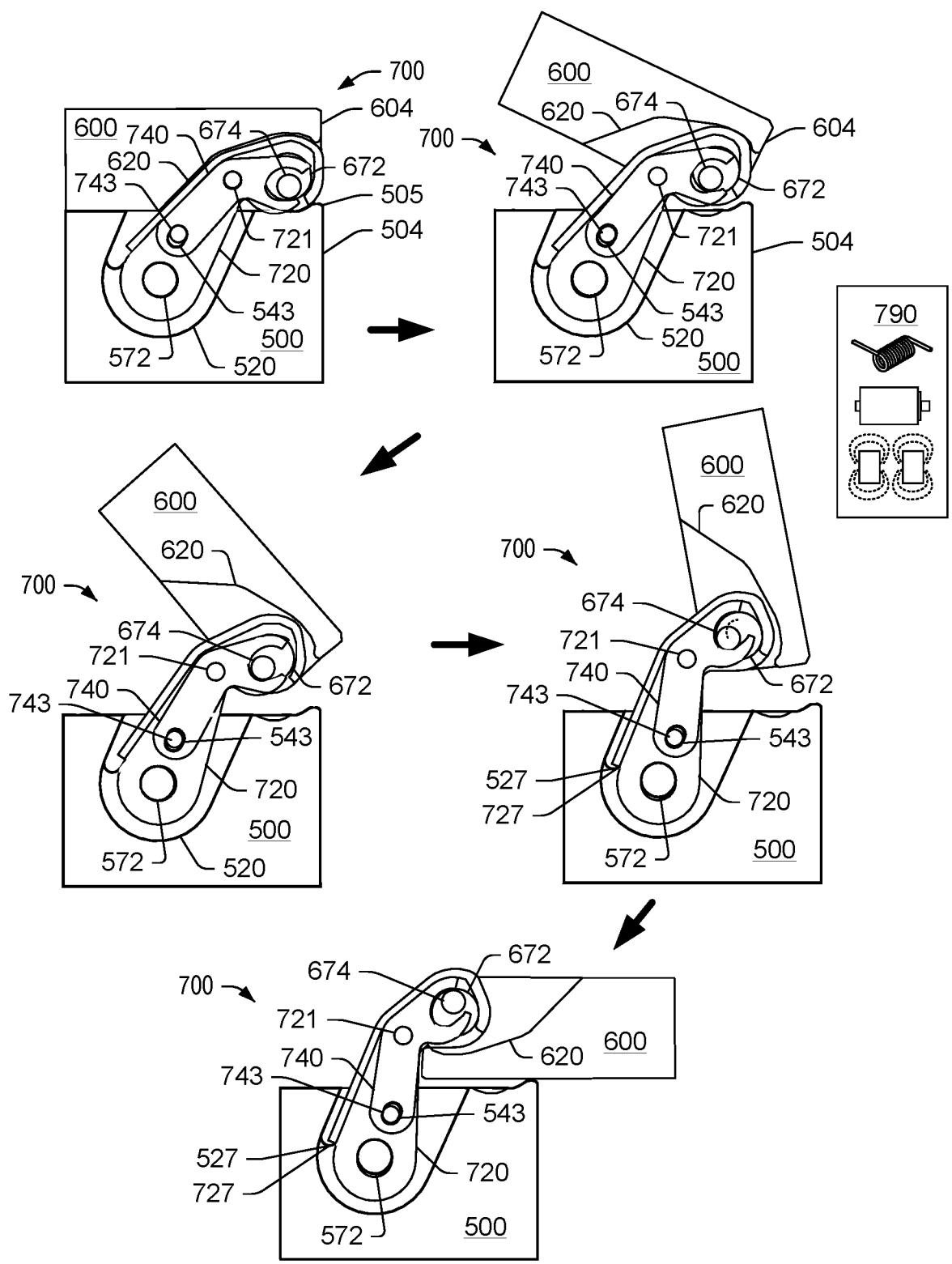
FIG. 5 is a series of diagrams of an example of a computing device.

FIG. 5 shows an example of the hinge assembly 700 with respect to the base housing 500 and the display housing 600 as transitioning from a closed position, to a first open position to a second open position to a third open position and to a fourth open position, which may be an approximately 180 degree open position.

In the example of FIG. 5, the base housing 500 include a hinge recess 520 and the display housing 600 includes a hinge recess 620. As explained, the base housing 500 can include the pivot 572 and the display housing 600 can include the pivot 672, which may further include a post 674 where an axis of the post 674 is offset from an axis of the pivot 672 (e.g., the post 674 can be an off-centered post). In the example of FIG. 5, the pivots 572 and 672 and the post 674 are shown with respect to a hinge link 720 and a scissor component 740. As shown, the hinge link 720 can include a scissor component pivot 721 for pivoting of the scissor component 740 with respect to the hinge link 720. In such an example, the base housing 500 may include a guide feature 543 such as, for example, an oblong hole, that may guide a guide pivot 743 of the scissor component 740. In such an example, a lower end or lower lobe of the scissor component 740 is restrained with respect to the guide feature 543 of the base housing 500 while the scissor component 740 is also restrained by the scissor component pivot 721 of the hinge link 720. In such an example, the hinge link 720 and the scissor component 740 act like a scissor (e.g., or scissors). A scissor may be defined to include blades that can be separated and closed. In the example of FIG. 5, the scissor component 740 can cooperate with the post 674 to help guide movement of the display housing 600 with respect to the base housing 500, for example, to provide a gap between the housings 500 and 600 that allows for rotation of the display housing 600 about the pivot 672 without a back corner of the back edge 604 contacting a back corner of the back edge 504 of the base housing 500.

In the example of FIG. 5, in the closed position, the recess 520 of the base housing 500 may be covered by the display housing 600 where a portion of the hinge link 720 may be exposed at the back edge 604 side of the display housing 600. As an example, the back edge 504 of the base housing 500 may include a lip 505 that extends upwardly, for example, toward the display housing 600 when the housings 500 and 600 are in a closed position. As an example, the display housing 600 may include a chamfered edge (e.g., a chamfered back edge). As shown in the closed position view of FIG. 5, a lower portion of the scissor component 740 may be in contact with a portion of the hinge component 720 that is to the left side of the scissor component pivot 721 while a top portion of the scissor component 740 may have a clearance with respect to a portion of the hinge component 720 that is to the right side of the scissor component pivot 721. In contrast, in the fourth open position, the lower portion of the scissor component 740 may have a clearance with respect to the portion of the hinge component 720 that is to the left side of the scissor component pivot 721 while the top portion of the scissor component 740 may be in contact with the portion of the hinge component 720 that is to the right side of the scissor component pivot 721. As shown, the top portion of the scissor component 740 can contact the post 674 such that movement between the two is coordinated (e.g., coupled) over a range of open angles of various open positions of the display housing 600 with respect to the base housing 500.

In the example of FIG. 5, in the first open position, a slight clearance or gap is created between the display housing 600 and the base housing 500. As shown, the position of the post 674 changes with respect to the scissor component 740. As mentioned, the axis of the post 674 can be offset from the axis of the pivot 672 such that the post 674 moves in a circular manner (e.g., sweeps an arc) when the display housing 600 is rotated via the pivot 672 (e.g., about a rotational axis that remains fixed). In such an example, the scissor component 740 and the post 674 can engage, which may effectively actuate the scissor component 740 to thereby cause an upwardly lifting motion of the display housing 600 via the hinge assembly 700. In such an example, the scissor component 740 pivots about the pivot 721, for example, as guided by the guide pivot 743 with respect to the guide feature 543 of the base housing 500. For example, the guide pivot 743 may be a post (e.g., an axle or a shaft) that is received by a bore of the scissor component 740 and by the guide feature 543, which may be an oblong bore of the base housing 500 where such features guide and limit motion of the scissor component 740 as it pivots about the pivot 721 while contacting the post 674.

In the second and third open positions, the path of the post 674 with respect to the scissor component 740 can be discerned; noting that, in transitioning from the third open position to the fourth open position, the scissor component 740 may be substantially static (e.g., its lifting task being completed, etc.). For example, from the third to the fourth open positions, the display housing 600 may rotate about the pivot 672 while the post 674 follows a common contour shape of the pivot 672 and the scissor component 740. In these two open positions, the shape of an end of the scissor component 740 that can contact the post 674 is shown to be different than that of a circular shape of the pivot 672. In such an approach, contact between the scissor component 740 and the post 674 of the display housing 600 can guide the direction of travel of the display housing 600; noting that the lower portion of the scissor component 740 may be guided by the guide feature 543 of the base housing 500.

Figure 8:
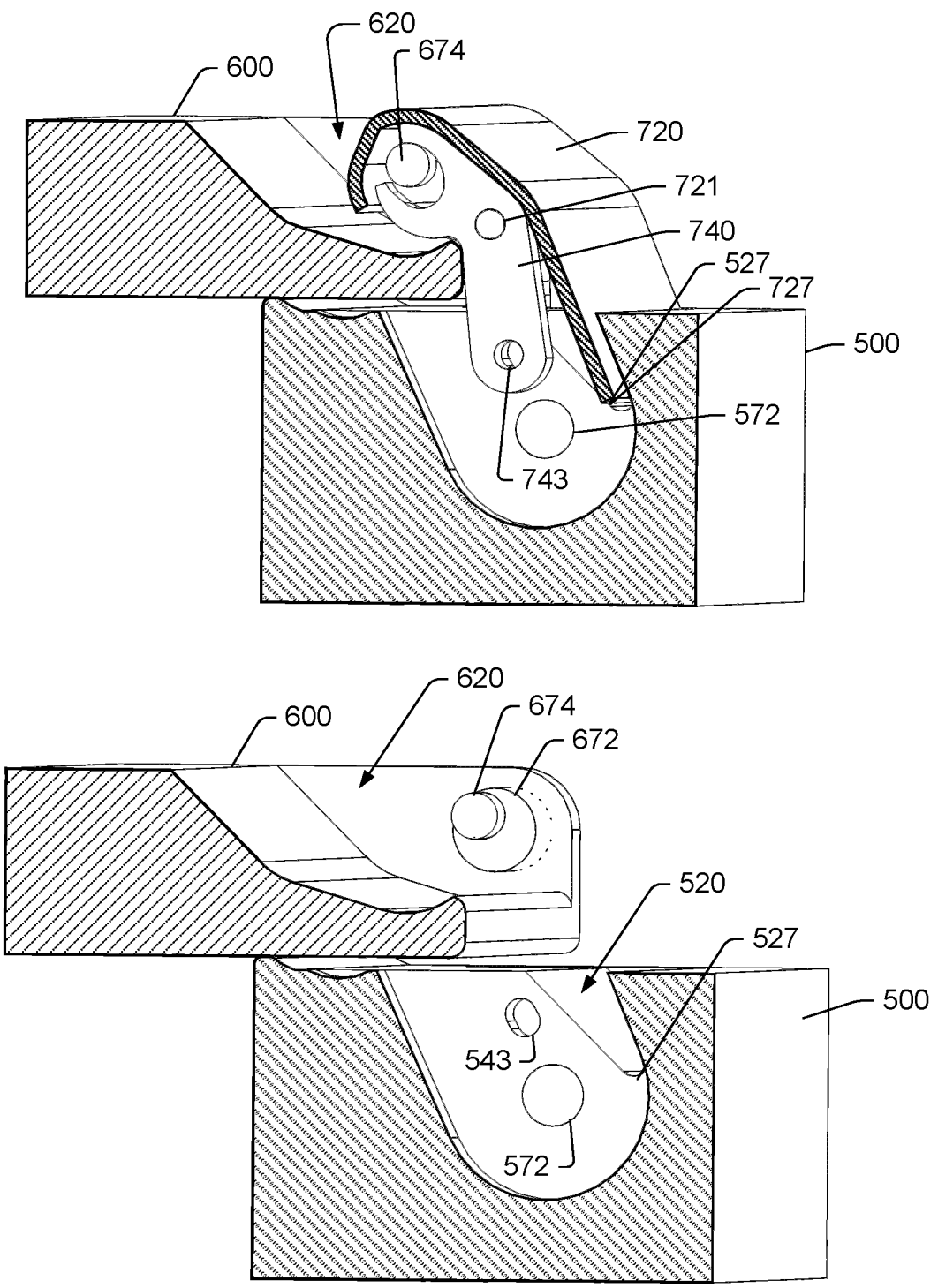
FIG. 8 is a series of diagrams of an example of a hinge assembly.

As an example, in the third open position of the display housing 600 with respect to the base housing 500, the hinge link 720 may be substantially static, for example, a stop 727 of the hinge link 720 may contact a stop surface 527 of the recess 520 of the base housing 500, which may be discerned in various other views (see, e.g., FIG. 8). In such an approach, the hinge link 720 may remain relatively stable as the display housing 600 is rotated via the pivot 672, for example, to the fully open, fourth open position (e.g., at approximately 180 degrees). As shown in the example of FIG. 5, the clearance between the base housing 500 and the display housing 600 is sufficient for a back corner of the back edge 604 of the display housing 600 to clear the base housing 500 such that the display housing 600 can be rotated to the fourth open position. Further, as shown, the guide feature 543 of the base housing 500 remains stationary as it is part of the base housing 500 while the guide pivot 743 may translate within the guide feature 543.

As an example, the transition of the display housing 600 between the third and fourth open positions may be referred to as a second stage of motion. For example, in such a second stage of motion, the hinge link 720 and the scissor component 740 may be relatively static whereby the display housing 600 rotates about the pivot 762 in a manner where the post 674 may follow a common contour of the pivot 672 and a surface of the scissor component 740. In such an example, a first stage may be referred to as a lifting stage or lift stage that provides sufficient clearance for the second stage. In such an example, the hinge link 720 and the scissor component 740 may be referred to as components of a lift mechanism.

As shown in the example of FIG. 5, in the fourth open position, a back side of the display housing 600 may contact the lip 505 of the base housing 500, which may thereby act as a stop (e.g., a stop surface, etc.). As an example, the lip 505 may be made of a resilient material and/or one or more other types of material, which may, for example, provide for reduced risk of damage to the back side of the display housing 600.

FIG. 5 also shows various examples of biasing components 790, which may include one or more springs, one or more electric motors, one or more magnets and/or ferromagnetic materials, etc. As an example, a spring may be a torsion type of spring that may be positioned with respect to a pivot to bias a component or components, for example, to assist with movement of the hinge assembly 700 toward a position (e.g., closed position, open position, etc.) and/or to help maintain a component or components at a position. As an example, an electric motor may be actuatable responsive to a signal to cause movement of a component or components of the hinge assembly 700 toward a position (e.g., closed position, open position, etc.) and/or to help maintain a component or components at a position. As an example, one or more magnets (e.g., permanent, electro-permanent, electric, etc.) may be utilized to cause movement of a component or components toward a position (e.g., closed position, open position, etc.) and/or to help maintain a component or components at a position. As an example, a housing or housings may include one or more magnets and/or ferromagnetic materials that may operate as a latch to maintain housings in a closed position, where, for example, upon release of the latch, a hinge assembly or hinge assemblies may be forcibly biased to cause one housing to transition to an open position with respect to another housing.

Figure 6:
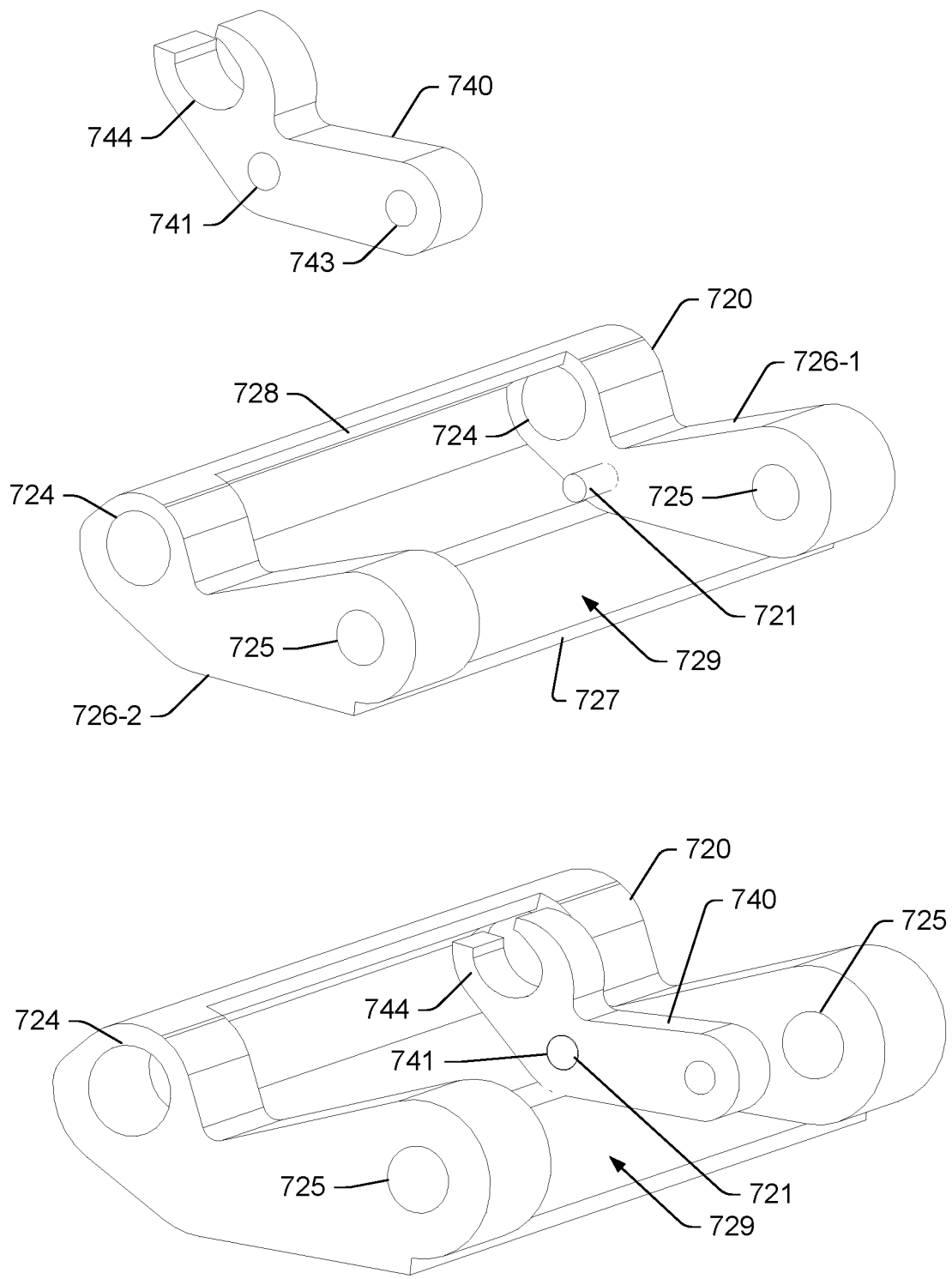
FIG. 6 is a series of diagrams of examples of components of an example of a hinge assembly.

FIG. 6 shows a series of perspective views of examples of the hinge link 720 and the scissor component 740. As shown, the scissor component 740 can include a bore 741 for the scissor component pivot 721 of the hinge link 720, the guide pivot 743, which may receive a post (e.g., an axle or a shaft) and a shaped end 744 that may be an open end. As explained, the shaped end 744 may be non-circular and may include one or more arc shaped portions that may correspond to a portion of an arc of the pivot 672, which may cooperate with a through bore 724 of the hinge link 720. As explained, the pivot 672 may include the post 674 as a feature that extends therefrom. For example, the pivot 672 may be itself a post (e.g., an axle or a shaft) where the post 674 acts as a cam-like feature to control direction of travel of the display housing 600 at least in part via contact with the shaped end 744 of the scissor component 740.

In the example of FIG. 6, the hinge component 720 is shown as including two sides 726-1 and 726-2 (e.g., walls, etc.) with a recess 729 between the two sides 726-1 and 726-2 where a through bore 725 may extend between the two sides 726-1 and 726-2 that may receive an axle (e.g., a shaft) that may be part of or otherwise form the pivot 572 (e.g., consider a full axle, multiple axles, etc., that may be set into the base housing 500, etc.). As an example, the hinge link 720 may include an edge as the stop 727 and another edge 728. In such an example, the stop 727 may be disposed in the recess 520 of the base housing 500 and the edge 728 may be disposed in the recess 620 of the display housing 600. In such an example, the edge 728 may be a surface that does not form a stop or stop surface; noting that it may be positioned to facilitate positioning and/or movement of the scissor component 740.

As shown in the example of FIG. 6, the scissor component 740 may be seated in the recess 729 of the hinge link 720 where the scissor component pivot 721 cooperates with the bore 741 for pivotal motion of the scissor component 740 with respect to the hinge link 720. As explained, the pivot guide 743 may cooperate with a pivot guide feature that may be part of or otherwise coupled to the base housing 500 (see, e.g., FIG. 8).

As shown in the example of FIG. 6, the hinge link 720 may be defined as including lobes such as, for example, a first lobe and a second lobe where each of the lobes includes a respective pivot feature such as, for example, a bore, which may be a partial bore or a through bore. For example, the bore 725 may be associated with a lower lobe that is disposed in the recess 520 of the base housing 500 and the bore 724 may be associated with an upper lobe that is disposed in the recess 620 of the display housing 600. As an example, the scissor component 740 may include the shaped end 744 substantially aligned with the bore 724 of the upper lobe of the hinge link 720 where the shaped end 744 may change in its alignment due to pivoting about the scissor component pivot 721. As an example, the shaped end 744 of the scissor component 740 may be defined by one or more radii that may be less than a radius of the bore 724 of the hinge link 720.

Figure 7:
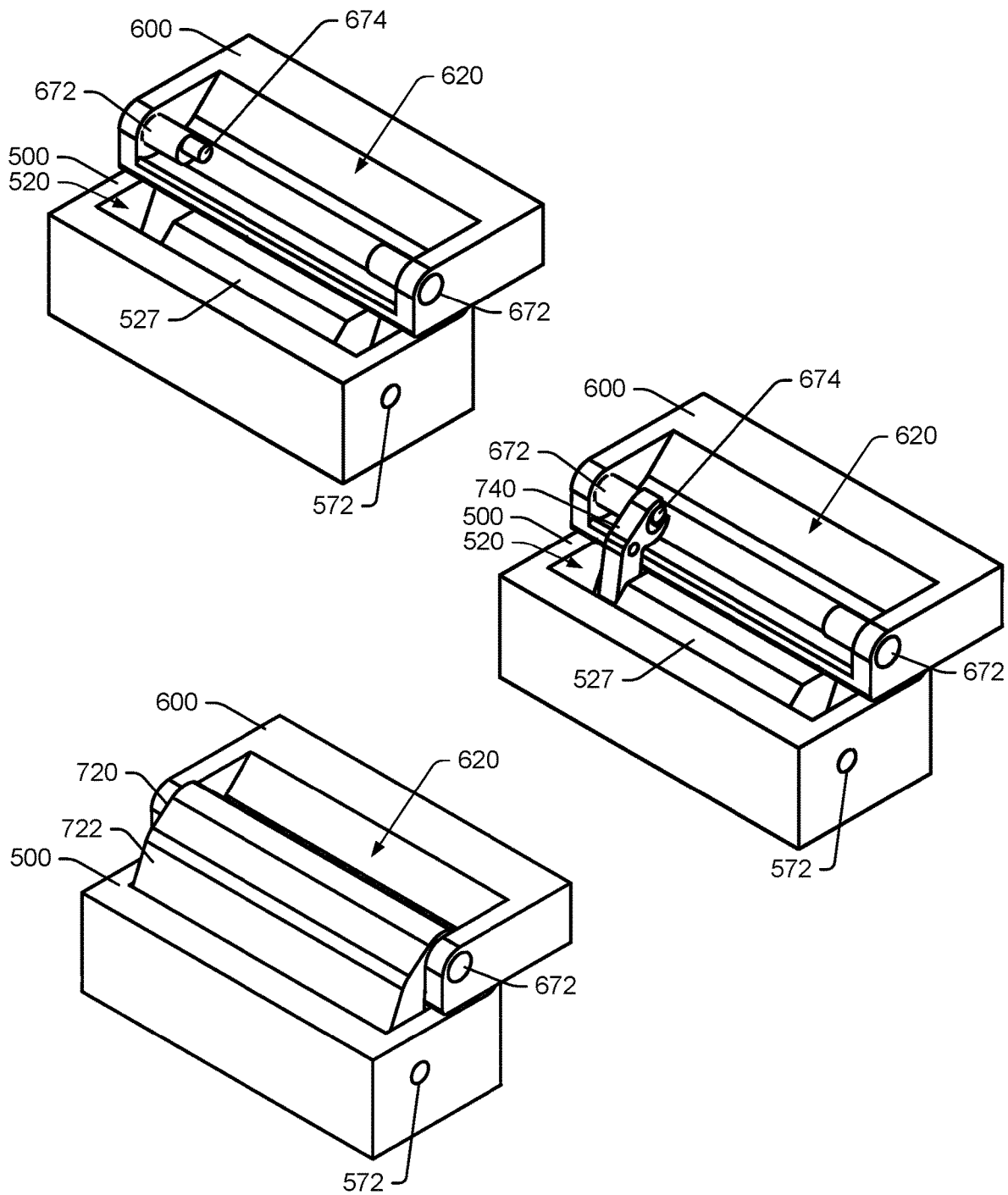
FIG. 7 is a series of diagrams of an example of a hinge assembly.

FIG. 7 shows a series of perspective views of an example of a portion of a device, including examples of the hinge link 720 and the scissor component 740. As shown, the base housing 500 can include the recess 520 and the display housing 600 can include the recess 620 as hinge recesses that can at least in part receive respective portions of the hinge link 720 as operatively coupled to the pivots 572 and 672, each of which may be a single pivot or a split pivot. For example, a split pivot may include two or more instances of a pivot (e.g., a bore and axle arrangement, etc.) that are aligned along a common axis. As explained, the hinge link 720 may be a single plate or may include multiple plates, which may be referred to as sides. As explained, where multiple plates or sides are included in a hinge component 720, a recess may be disposed between two sides where, for example, the scissor component 740 may be received within the recess; noting that the scissor component 740 may be suitable for coupling to a side or sides, which may not be within a recess.

As shown in the example of FIG. 7, the scissor component 740 may be disposed between a side of a feature that defines the stop surface 527 of the base housing 500 and a side of the hinge link 720. In such an example, the scissor component 740 may be constrained, for example, with respect to side-to-side movement, which may provide for proper engagement of the scissor component 740 with the post 674. As an example, the post 674 and the scissor component 740 may form a type of cam such as a cam that guides movement of the display housing 600 during a transition of the display housing 600 with respect to the base housing 500.

As shown in the example of FIG. 7, the hinge link 720 can include a back side 722 that may provide for covering, at least in part, the recess 520 such that risk of debris entering the recess 520 may be reduced.

FIG. 8 shows a series of cut-away views of a portion of an example of a device with and without various examples of hinge assembly components and/or features. As shown, the base housing 500 may include a stop surface 527 that can contact a stop 727 of the hinge link 720, which may be an edge of the hinge link 720 or another surface thereof. In the example of FIG. 8, the pivot guide feature 543 is shown as being an oblong hole disposed in a side of the recess 520. In such an example, the scissor component pivot 721 may be to one side of the scissor component 740 and the pivot guide feature 543 may be to another, opposing side of the scissor component 740 when received in the recess 520. As an example, the scissor component 740 may be disposed between a side of the hinge link 720 and a wall of the recess 520 of the base housing 500. As an example, a post may be positioned in the bore 743 of the scissor component 740 and received at least in part by the pivot guide feature 543 of the base housing 500.

Figure 9:
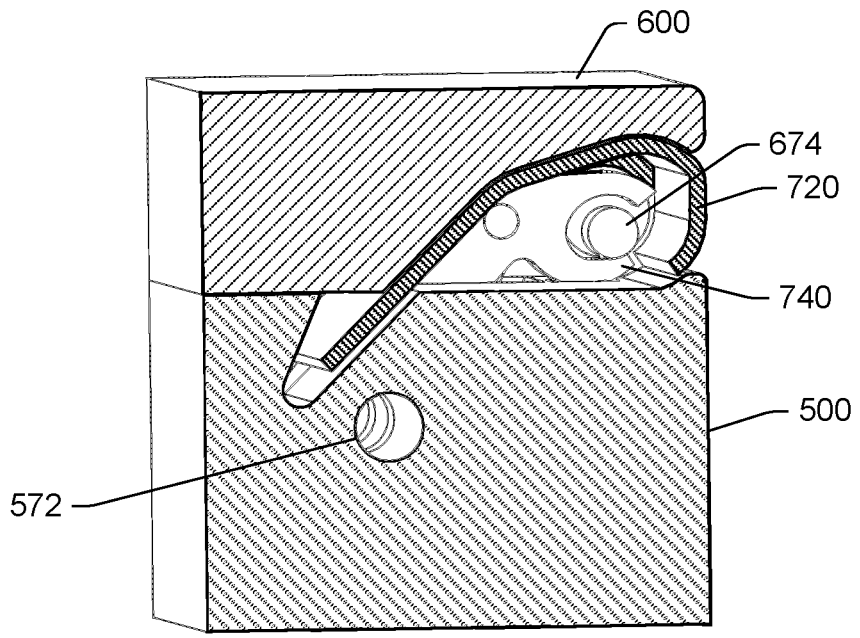
FIG. 9 is a series of diagrams of an example of a hinge assembly.
Figure 9:
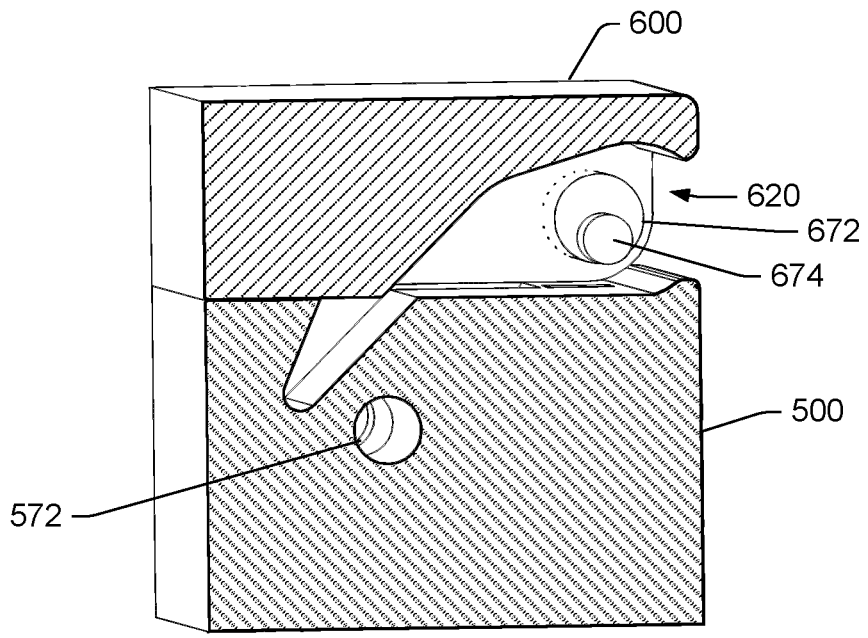

FIG. 9 shows a series of cut-away views of a portion of an example of a device with and without various examples of hinge assembly components and/or features. As shown, the scissor component 740 may be disposed between a side of the hinge link 720 and a side of the recess 520 of the base housing 500. In such an example, the scissor component 740 may be secured for pivotal movement responsive to opening of the display housing 600 with respect to the base housing 500 and responsive to closing of the display housing 600 with respect to the base housing 500.

As an example, a computing device may include one or more tower hinge assemblies that can allow for access to a back of the computing device, which may include one or more ports, one or more cooling features, etc. As an example, a tower hinge assembly may provide for a notchless display housing outer cover or shell (e.g., back side, opposite a display side). As explained, a hinge assembly may utilize a crossed four-bar linkage that functions as a hinge that can also position a display housing in a manner that provides suitable clearance to rotate a full 180 degrees without requiring notches in an outer shell of a display housing or without requiring a large chamfer at the back of base housing (e.g., a keyboard housing). As an example, a computing device may be defined using terms A-cover, B-cover, C-cover and D-cover. For example, a display housing may include an A-cover as an outer or back side shell and a B-cover as a display side shell that may be or include a display bezel while a base housing (e.g., a keyboard housing) may include a D-cover as a bottom side shell and a C-cover as an opposing side shell, which may be a keyboard bezel. As an example, a hinge assembly may provide for desirable A-cover and C-cover features.

As an example, a hinge assembly may utilize a dual pivot hinge link with a scissor component that forms a scissor mechanism that can lift one housing away from another housing such as, for example, a display housing away from a keyboard housing such that a clearance is generated to rotate the housings to approximately 180 degrees. In such an example, a computing device may be formed without requiring notches in an A-cover or a large chamfer at the back of a C-cover.

As an example, from a closed position, a hinge assembly may provide for lifting a display housing where, for example, a scissor mechanism is engaged to cause such lifting, which may provide a clearance with respect to a base housing for a back edge corner of the display housing. In such an example, as a display housing is opened, responsive to rotation, clearance may increase, eventually to a maximum clearance. In such an example, upon reaching the maximum clearance, the display housing may be further rotated to a desired position, which may be up to approximately 180 degrees. In such an example, the display housing may sit flat in a stepped manner where it may be supported by a C-cover of a base housing (e.g., a C-cover of a keyboard housing).

As an example, a device can include a first housing that includes a hinge recess and a pivot; a second housing that includes a hinge recess and a pivot; a hinge link coupled to the pivots, where a pivot coupling between the hinge link and the pivot of the second housing includes an off-centered post, and where the hinge link includes a scissor component pivot; and a scissor component coupled to the scissor component pivot that guides the pivot of the second housing via the off-centered post to generate a gap between the first housing and an end of the second housing upon transitioning the first housing and the second housing between a closed position and a fully open position. In such an example, the pivot of the second housing may include an axle and a bore and the off-centered post that extends from the axle, where a diameter of the bore exceeds a diameter of the off-centered post by at least 10 percent. As explained, the post may operate as a type of cam.

As an example, a hinge link can include opposing pivot ends and a scissor component pivot may be disposed on a hinge link between the opposing pivot ends.

As an example, a pivot of a second housing may include an axle and a bore and a post that extends from the axle, where a scissor component includes an open end, and where a radius of the post is less than a radius of the open end.

As an example, a scissor component may include an open end, where during transitioning, a post of a pivot of a second housing contacts a surface of the open end. As explained, a scissor component can include an open end that may be an open bore or a closed bore that can cooperate with a post where the scissor component and the post may operate as a type of cam to guide movement of a housing (e.g., a display housing) via a hinge assembly that couples the housing to another housing.

As an example, a hinge link may include a first lobe with a first closed bore and a second lobe with a second closed bore, where the first closed bore includes a center that coincides with a center of a pivot of a first housing, where the second closed bore includes a center that coincides with a center of a pivot of a second housing, and where a post offset from a center of the second closed bore engages a scissor component responsive to rotation of the second housing with respect to the first housing.

As an example, a thickness of a first housing may exceed a thickness of a second housing. In such an example, the first housing may be a base housing and the second housing may be a display housing. In such an example, the base housing may include a keyboard.

As an example, a first housing may be a base housing of a computing device that includes a processor and memory accessible to the processor and a second housing may be a display housing that includes a display.

As an example, a device may be in a closed position that includes an angle of approximately 0 degrees between a second housing and a first housing or the device may be in a fully open position that includes an angle of approximately 180 degrees between the second housing and the first housing. In such an example, in the closed position, the second housing may be adjacent and parallel to the first housing.

As an example, in a fully open position, a portion of a second housing may extend outwardly beyond a hinge recess end of a first housing where another portion of the second housing overlaps the first housing. In such an example, in the fully open position, the second housing may be parallel to the first housing.

As an example, a second housing (e.g., a display housing) may include a chamfered corner at a hinge recess end of the second housing. As an example, a first housing may include a lip at a hinge recess end of the first housing. In such an example, the second housing may include a chamfered corner at a hinge recess end of the second housing, where, in a closed position, the chamfered corner accommodates the lip.

As an example, a hinge link may include opposing sides and a recess disposed between the opposing sides. In such an example, a scissor component may be disposed at least in part within the recess. In such an example, the scissor component may include a pivot bore, where one of the opposing sides includes a pivot axle, and where the pivot axle is received by the pivot bore. As an example, a hinge link may include opposing sides (e.g., walls, etc.) where each of the opposing sides includes a first lobe with a first bore and a second lobe with a second bore.

As an example, a method may include, in a computing device that includes a base housing and a display housing coupled via a link and scissor component hinge, supporting the display housing in an open position with respect to the base housing where, in the open position, the display housing is oriented orthogonally at approximately 90 degrees to the base housing and disposed a distance away from the base housing to form a corner clearance gap for clearance of a corner of the display housing for full opening of the display housing with respect to the base housing to an angle of approximately 180 degrees.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
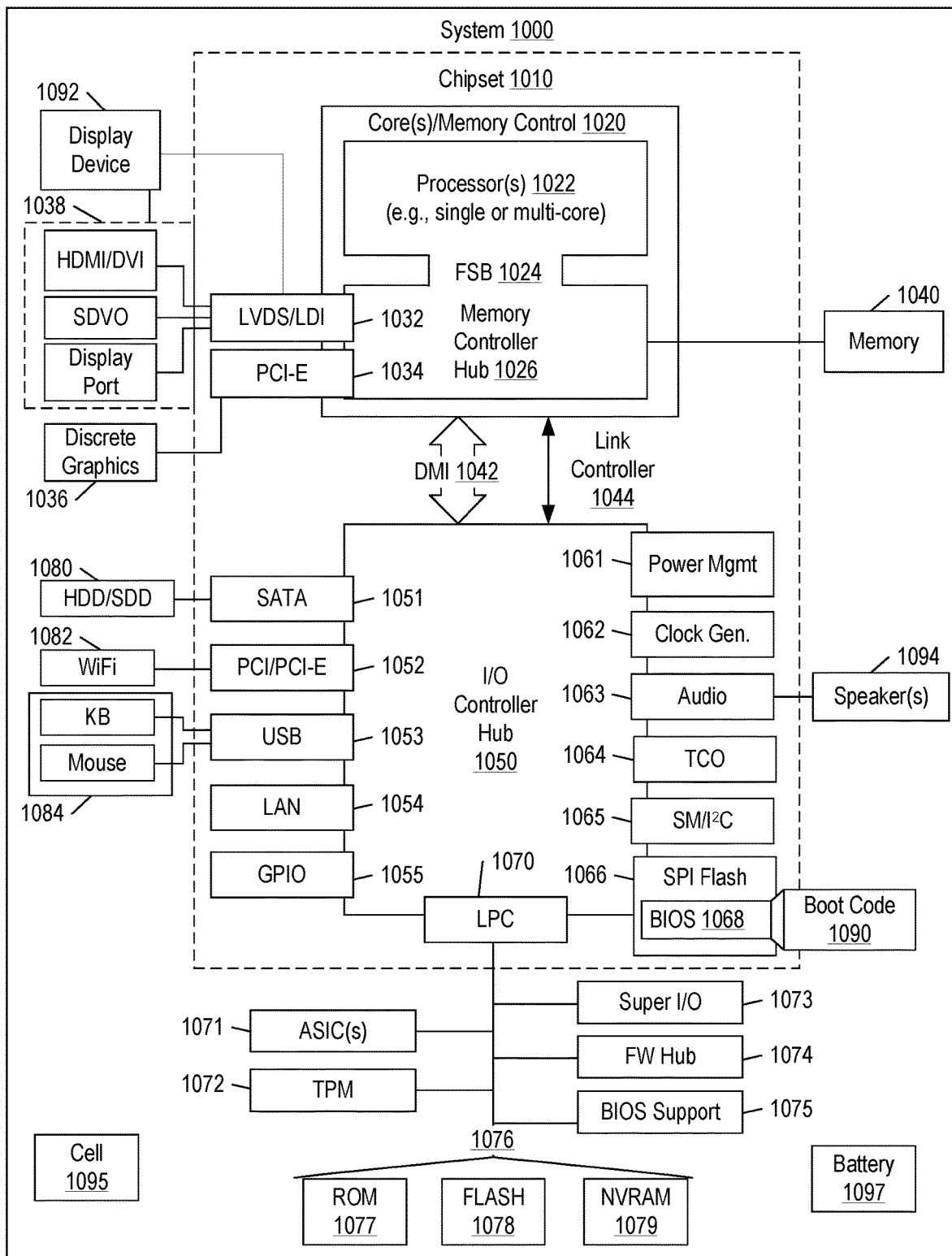
FIG. 10 is a diagram of an example of a system that includes one or more processors.

While various examples of circuits or circuitry have been discussed, FIG. 10 depicts a block diagram of an illustrative computer system 1000. The system 1000 may be a computer system, such as one of the THINKCENTER or THINKPAD series of personal computers sold by Lenovo (US) Inc. of Morrisville, NC, or a workstation computer system, such as the THINKSTATION, which are sold by Lenovo (US) Inc. of Morrisville, NC; however, as apparent from the description herein, a system or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a first housing that comprises a hinge recess and a pivot;
a second housing that comprises a hinge recess and a pivot;
a hinge link coupled to the pivots, wherein a pivot coupling between the hinge link and the pivot of the second housing comprises an off-centered post, and wherein the hinge link comprises a scissor component pivot; and
a scissor component coupled to the scissor component pivot that guides the pivot of the second housing via the off-centered post to generate a gap between the first housing and an end of the second housing upon transitioning the first housing and the second housing between a closed position and a fully open position.

2. The device of claim 1, wherein the pivot of the second housing comprises an axle and a bore and wherein the off-centered post extends from the axle, wherein a diameter of the bore exceeds a diameter of the off-centered post by at least 10 percent.

3. The device of claim 1, wherein the hinge link comprises opposing pivot ends and wherein the scissor component pivot is disposed on the hinge link between the opposing pivot ends.

4. The device of claim 1, wherein the pivot of the second housing comprises an axle and a bore and wherein the off-centered post extends from the axle, wherein the scissor component comprises an open end, and wherein a radius of the off-centered post is less than a radius of the open end.

5. The device of claim 1, wherein the scissor component comprises an open end, and wherein during the transitioning, the off-centered post of the pivot of the second housing contacts a surface of the open end.

6. The device of claim 1, wherein the hinge link comprises a first lobe with a first closed bore and a second lobe with a second closed bore, wherein the first closed bore comprises a center that coincides with a center of the pivot of the first housing, wherein the second closed bore comprises a center that coincides with a center of the pivot of the second housing, and wherein the off-centered post is offset from a center of the second closed bore and engages the scissor component responsive to rotation of the second housing with respect to the first housing.

7. The device of claim 1, wherein a thickness of the first housing exceeds a thickness of the second housing.

8. The device of claim 1, wherein the first housing comprises a base housing of a computing device that comprises a processor and memory accessible to the processor and wherein the second housing comprises a display housing that comprises a display.

9. The device of claim 1, wherein the closed position comprises an angle of approximately 0 degrees between the second housing and the first housing and wherein the fully open position comprises an angle of approximately 180 degrees between the second housing and the first housing.

10. The device of claim 1, wherein, in the closed position, the second housing is adjacent and parallel to the first housing.

11. The device of claim 1, wherein, in the fully open position, a portion of the second housing extends outwardly beyond a hinge recess end of the first housing and another portion of the second housing overlaps the first housing.

12. The device of claim 11, wherein, in the fully open position, the second housing is parallel to the first housing.

13. The device of claim 1, wherein the second housing comprises a chamfered corner at a hinge recess end of the second housing.

14. The device of claim 1, wherein the first housing comprises a lip at a hinge recess end of the first housing.

15. The device of claim 14, wherein the second housing comprises a chamfered corner at a hinge recess end of the second housing, and wherein, in the closed position, the chamfered corner accommodates the lip.

16. The device of claim 1, wherein the hinge link comprises opposing sides and a recess disposed between the opposing sides.

17. The device of claim 16, wherein the scissor component is disposed at least in part within the recess.

18. The device of claim 17, wherein the scissor component comprises a pivot bore, wherein one of the opposing sides comprises a pivot axle, and wherein the pivot axle is received by the pivot bore.

19. The device of claim 16, wherein each of the opposing sides comprises a first lobe with a first bore and a second lobe with a second bore.

20. A method comprising:
in a computing device that comprises a first housing that comprises a hinge recess and a pivot, a second housing that comprises a hinge recess and a pivot, a hinge link coupled to the pivots, wherein a pivot coupling between the hinge link and the pivot of the second housing comprises an off-centered post, and wherein the hinge link comprises a scissor component pivot, and a scissor component coupled to the scissor component pivot that guides the pivot of the second housing via the off-centered post, supporting the second housing in an open position with respect to the first housing wherein, in the open position, the second housing is oriented orthogonally at approximately 90 degrees to the first housing and disposed a distance away from the first housing to form a corner clearance gap for clearance of a corner of the second housing for full opening of the second housing with respect to the first housing to an angle of approximately 180 degrees.

* * * * *